Figure 1:
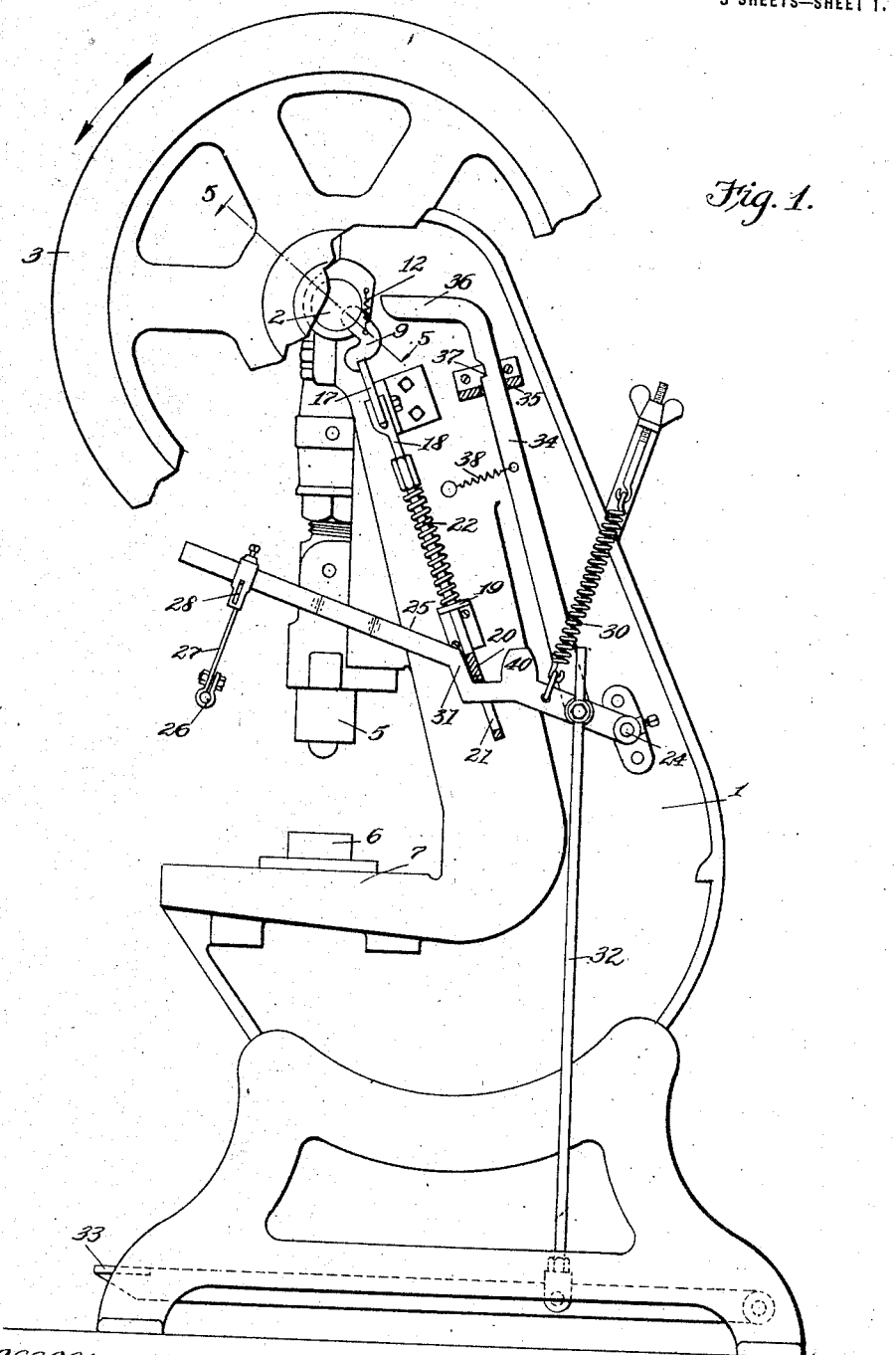

E. ROTH.
SAFETY ATTACHMENT.
APPLICATION FILED JULY 18, 1914.

1,172,394.

Patented Feb. 22, 1916.
3 SHEETS—SHEET 1.

E. ROTH.
SAFETY ATTACHMENT.
APPLICATION FILED JULY 18, 1914.

1,172,394.

Patented Feb. 22, 1916.
3 SHEETS—SHEET 2.

Witnesses:
R. L. Buck.
H. B. McGill.

Inventor,
Emil Roth
By Hull & Smith attys.

E. ROTH.
SAFETY ATTACHMENT.
APPLICATION FILED JULY 18, 1914.

1,172,394.

Patented Feb. 22, 1916.
3 SHEETS—SHEET 3.

Witnesses:
R. L. Bruck.
H. B. McGill.

Inventor,
Emil Roth
By Hull & Smith
Attys.

UNITED STATES PATENT OFFICE.

EMIL ROTH, OF CLEVELAND, OHIO, ASSIGNOR TO THE CLEVELAND FOUNDRY COMPANY, OF CLEVELAND, OHIO, A CORPORATION OF OHIO.

SAFETY ATTACHMENT.

1,172,394.  Specification of Letters Patent.  Patented Feb. 22, 1916.

Application filed July 18, 1914.  Serial No. 851,706.

*To all whom it may concern:*

Be it known that I, EMIL ROTH, a citizen of the United States, residing at Cleveland, in the county of Cuyahoga and State of Ohio, have invented a certain new and useful Improvement in Safety Attachments, of which the following is a full, clear, and exact description, reference being had to the accompanying drawings.

This invention relates to safety attachments for punch presses and similar machinery wherein there is danger of injury to the hands and arms of the operator through failure to remove the same from the path of the moving parts, and has particular relation to machines comprising moving parts which are ordinarily at rest but which are actuated for one or more excursions by the operation of a treadle, lever, handle, button, or other starting device.

Among the objects of this invention are the provision of means for maintaining the safety gate or guard in protecting position until the operation of the machine has nearly or entirely ceased; the provision of means whereby the gate or guard is retained in protective position during succeeding or repeating movements of the mechanism, whether the repeat movement be accidental or intentional; the provision of a device wherein the dwell of the gate or guard in a protective position is dependent upon the operation of the machine and not upon any act of the operator; the provision of a device wherein the return of the gate or guard to inoperative position will be utilized to effect more certainly the stoppage of the operating parts; and the provision of a device of this nature of great simplicity, convenience, reliability, and efficiency; while further objects and advantages will become apparent as this description proceeds.

Figure 2:
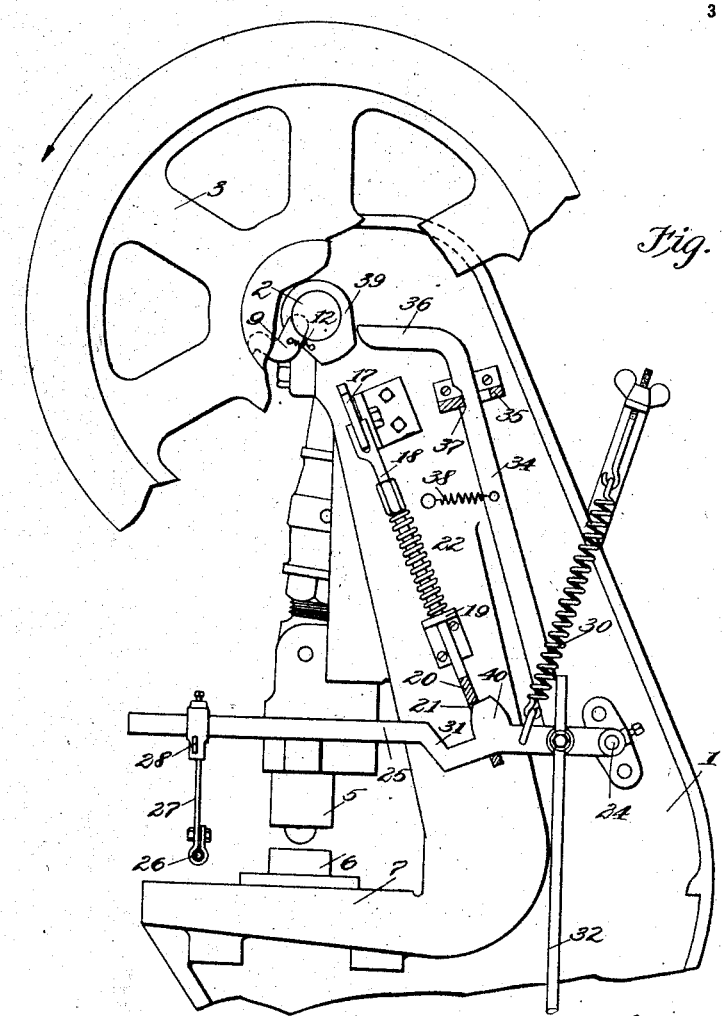
Figure 3:
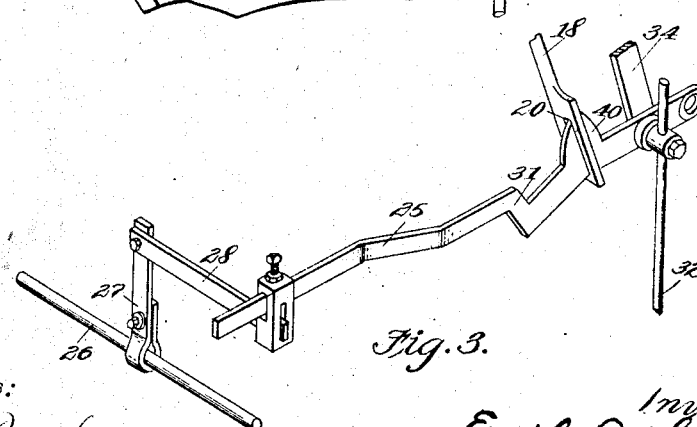
Figure 4:
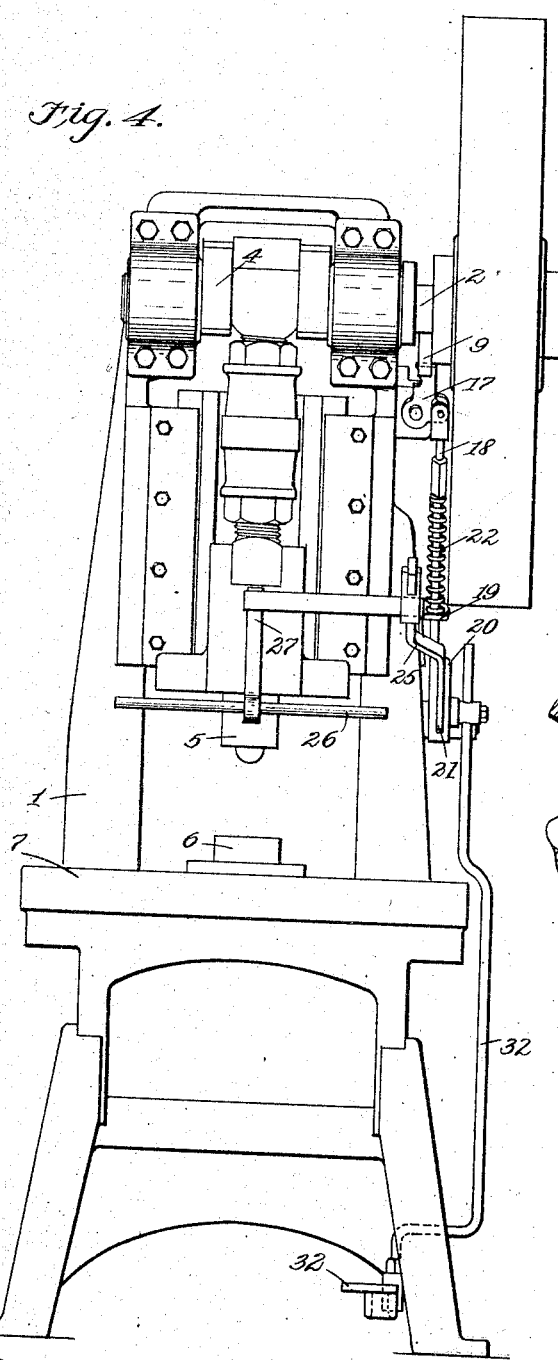
Figure 5:
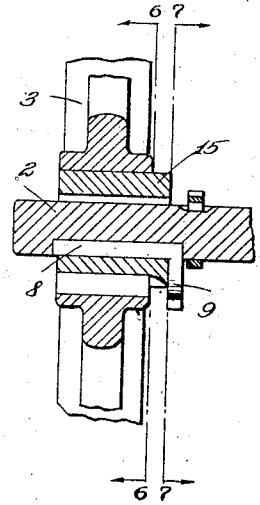
Figure 6:
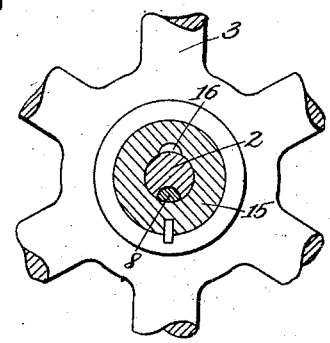

Generally speaking my invention may be defined as consisting of the combinations and constructions recited in the claims hereto annexed and illustrated, in one embodiment, in the drawings accompanying and forming part of this application, wherein;

Figure 1 represents a side elevation of a machine having my invention applied thereto, a portion of the machine being broken away to show the construction and arrangement of parts; Fig. 2 represents a side elevation of the same machine, the various parts of the safety attachment and of the machine being shown in the position assumed during operation; Fig. 3 is a perspective view of the movable portion of the safety attachment; Fig. 4 represents a front elevation of the machine illustrated in Figs. 1 and 2; Fig. 5 is a detail, cross-sectional view taken upon the line 5—5 of Fig. 1 and looking in the direction of the arrows; Fig. 6 is a detail view of the wheel hub and main shaft taken upon the line 6—6 of Fig. 5 and looking in the direction of the arrows; and Fig. 7 is a detail view of the clutch and releasing cam taken upon the line 7—7 of Fig. 5 and looking in the direction of the arrows.

Describing the parts by reference characters 1 represents the frame of the machine, here shown as a punch press, 2 represents the main shaft and 3 a fly wheel loosely sleeved upon that shaft. In the present embodiment the shaft 2 is illustrated as formed with a crank 4 suitably secured to a reciprocating die member 5 adapted to coöperate with a fixed die member 6 carried by the bed or table 7 supported by the machine frame, the arrangement being such that one complete reciprocation of the movable die member will be effected upon each rotation of the shaft 2. However these parts are shown merely for clearness of description and it will be understood that my invention is not restricted to use with devices of this character.

Figure 7:
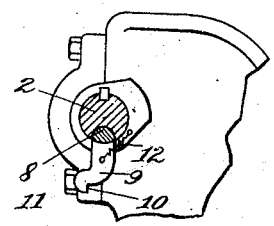

The fly wheel 3 is rotated continuously and, for the purpose of establishing driving connection with the shaft 2, a suitable clutch member is employed, that here illustrated comprising a rock bar 8 mounted in a groove in the part of the shaft 2 surrounded by the hub of the fly wheel, said rock bar extending to one side of the hub and being there provided with a finger 9 whose outer extremity is formed at one side with a flat abutment portion 10 (see Fig. 7). Connected to this finger, and to a suitable projection carried by the shaft, is a spring 12 which tends to rock the bar 8. This bar, as will appear more particularly from Fig. 6, has an outer surface which, when the parts are in the position shown in Figs. 1, 5, 6 and 7, is concentric with the shaft 1 and forms a part of the outer cylindrical surface thereof. The hub of the fly wheel is provided with a bushing 15 having a recess 16 which, when the bar 8 is rocked, is adapted to receive one of the corner portions of the same and thus secure the fly wheel and main shaft together in driving relation. The spring 12 tends to rock the bar 8 to force a corner to enter this recess, but this rocking action, when the mechanism is inoperative, is prevented by the engagement of the finger 9 with a clutch releasing member or catch 17 carried by some stationary part of the machine.

Operatively secured to the clutch releasing member or catch 17 is a reciprocable rod 18 suitably supported by the machine frame as by means of the angle plates 19, and having at its end the yoke 20 formed with an elongated slot 21. A suitable spring 22 normally maintains the rod 18 in a position to hold the latch 17 in the path of movement of the finger 9. Pivoted to the machine frame at the rear of this rod 18 is an arm 25 which passes through the slot 21 and at its front end carries the safety gate or guard 26. So far as my present invention is concerned this gate or guard may take any desirable or suitable shape, the device here shown consisting merely of a horizontal rod connected to a vertical hanger 27 secured to a horizontal bracket 28 which in turn is adjustably secured to the arm 25. The shape of the arm 25 will depend upon the particular shape, design, and construction of the machine to which the same may be applied. The guard carrying member or arm 25 is normally held in elevated position as shown in Fig. 1 by means of a spring 30 carried by the machine frame, the parts being so arranged and designed that this arm will normally lie in the upper end of the slot 21 and in contact with the upper end wall thereof. In the present embodiment I have shown the lever 25 as formed with an angular portion 31 arranged to engage the face of the yoke 20 when the arm is in elevated position and thus form a positive stop for the same.

Pivoted to the arm 25 at a suitable point, here illustrated as between the pivot 24 and yoke 20, is an operating rod 32 to which is attached a treadle 33 or other suitable actuator. Also connected to the arm 25 is a latch 34 projecting through a slotted bracket 35 carried by the machine frame, and having a projection 36 extending to a point adjacent the shaft 2, the latch being formed with a shoulder 37 adapted to engage the bracket when depressed so as to retain the arm 25 in lowered position until the release of the latch. A spring 38 connected to the machine frame and to the latch 34 tends to draw the latch to engaging position, while a cam 39 carried by the main shaft 2 serves to engage the projection 36 and disengage the latch at a proper time in the operation of the machine. Also the arm 25 is formed with a tooth 40 arranged to be drawn into and to fill the slot 21 upon the depression of this arm for a purpose to be hereafter described.

So long as the clutch member is retained in the position shown in Figs. 1, 6 and 7 by the engagement of the catch 17, the fly wheel will rotate freely on the end of the main shaft. Upon the actuation of the rod 32 the arm 25 is first drawn downwardly so as to bring the guard or gate between the operator and the dies and force him to remove his hands therefrom. Upon the arrival of the arm 25 at the lower end of the slot 21 the yoke 20 and rod 18 are moved against the tension of the spring 22, withdrawing the catch 17 and freeing the finger 9 which is then free to be moved by the spring 12 so as to rock the bar 8 into engagement with the fly wheel upon the arrival of the notch 16 opposite thereto. Simultaneously the tooth 40 has been drawn into the slot 21 and the latch 34 has become locked against the bracket 35. The shaft 2 is now forced to make at least one rotation, and in case the operator releases the rod 32 prior to the completion of this rotation, it will ordinarily be arrested when one rotation has been completed, the cam 39 having released the latch 34 so as to permit the arm 25 to rise and thereby free the rod 18 so that the spring 22 can restore the catch 17 to obstructing position. However if the operative shall hold the rod depressed longer than required to make a complete revolution, the latch 34 will merely be rocked to and fro as the cam 39 passes the same and will again become locked in depressed position so as to retain the gate in protecting position until its release upon a succeeding rotation, thus permitting the raising of the gate only at a predetermined period in the rotation of the main shaft. Conversely, if the operative gives the rod 32 only an instantaneous shove, the gate is necessarily lowered before the mechanism can act and raising of the gate is delayed until the first rotation is substantially completed and the movable die has been withdrawn to its elevated position.

In case the catch 17 should for some reason fail to be returned to obstructing position upon the release of the rod 32 and the disengagement of the latch 34, the engagement of the yoke 20 with the tooth 40 will likewise prevent any movement of the guard member. This is something which can occur by reason of a binding of the rod 18 or a slipping or cramping of some of the joints. However, in case the movement be sufficiently great to disengage the tooth 40 from the end of the slot, the upward movement of the arm 25 under the influence of the spring 30 will cause it to strike the end wall of the slot a sharp upward blow thus tending the more surely to return the catch to obstructing position. Thus it will be seen that the gate or guard can be moved to non-protecting position only during a certain phase of the machine operation, namely, that immediately before the clutch finger 9 comes to the catch 17, and that upon such movement of this gate the action of the tooth 40 from the yoke will move this catch toward engaging position. If the rod 32 is released at any time before the enlarged portion of the cam passes by the extension 36 of the latch 34 the gate or guard will rise and carry with it the clutch catch. If delayed until after this part of the cam has left the latch the gate will be held down and the press will repeat.

While I have described my invention in detail and pointed out at length the mode of applying the same to a particular mechanism, it will be understood that I do not confine myself to use with such mechanism or to the mode of applying the same herein set forth. Also I do not confine myself to any details, constructions or arrangements except as the same are positively included in the claims hereto annexed or rendered necessary by the prior state of the art.

Having thus described my invention, what I claim is:—

1. In a safety guard attachment for machines the combination, with a guard carrying member, of a manually operable member connected to the guard carrying member, a clutch for the machine, a clutch releasing member, said guard carrying member being independently movable with relation to the clutch releasing member until the guard is moved substantially to its protective position, additional movement of the guard carrying member serving to actuate the clutch releasing member, a latch connected to said guard carrying member and adapted to lock the same in protective position, and striking means carried by the machine and adapted to release said latch at a predetermined time in the machine operation.

2. In a safety guard attachment for machines, the combination, with a guard carrying member and a manually operable member connected thereto and arranged to move the same into protective position, of a clutch releasing member operatively connected to said guard carrying member and arranged to be actuated only toward the termination of the movement of said guard member into protective position, means independent of said manually operable member for retaining said guard in protective position, and means operative by the movement of the machine for disengaging said first means and restoring said guard to unprotective position in fixed phase relation with the machine operation.

3. In a safety guard attachment of the character set forth, the combination, with a guard carrying member, a clutch releasing member, and connections between said members whereby the former will be moved to releasing position upon the arrival of the later at protective position, of means operative substantially simultaneously with the actuation of said clutch releasing member for locking said guard carrying member in protective position, and means operated by the clutch driven mechanism for unlocking said guard carrying member at a predetermined time in the movement of such mechanism.

4. In a safety guard attachment of the character set forth, the combination, with a guard carrying member, a clutch releasing member, and connections between said members whereby the former will be moved to releasing position upon the arrival of the latter at protective position, of means operative substantially simultaneously with the actuation of said clutch releasing member for locking said guard carrying member in protective position, means operated by the clutch driven mechanism for unlocking said guard carrying member at a predetermined time in the movement of such mechanism, and means for preventing the movement of said guard carrying member to unprotecting position even after such unlocking except simultaneously with the return movement of said clutch releasing member toward engaging position.

5. In a safety guard attachment of the character set forth, the combination, with a guard carrying member and a clutch releasing member operatively connected thereto so as to be actuated upon the arrival of said first member at protective position, of a latch device connected to said guard carrying member and adapted to secure the same in protecting position, and a disengaging member carried by the clutch driven mechanism and adapted to engage said latch member at a predetermined point in the operation of said mechanism whereby said guard carrying member is unlocked.

6. In a device of the character set forth, the combination, with a constantly operated power device, and mechanism adapted to be driven thereby, of a clutch for said mechanism, a clutch releasing member adapted to disengage said power device from said mechanism at predetermined phases of the operation of the same, guard devices adapted to be interposed between the mechanism and operator, manually operable means for moving said guard devices to protecting position, connections between said guard devices and said clutch releasing mechanism whereby engagement of said clutch is permitted upon the movement of said guard devices to protecting position, and means for preventing the movement of said guard devices to non-protecting position except between certain phases of the operation of the mechanism.

7. In a device of the character set forth, the combination, with a constantly operated power device, and mechanism adapted to be driven thereby, of a clutch for said mechanism, a clutch releasing member adapted to disengage said power device from said mechanism at predetermined phases of the operation of the same, guard devices adapted to be interposed between the mechanism and operator, manually operable means for moving said guard devices to protecting position, connections between said guard devices and said clutch releasing mechanism whereby engagement of said clutch is permitted upon the movement of said guard tive upon the return of said guard devices to non-protecting position for moving said clutch releasing member toward engaging position, and means for preventing the return of said guard devices to non-protecting position except when said mechanism has arrived at a phase of its operation immediately preceding that at which said clutch may be disengaged.

8. In a device of the character described, the combination, with a guard carrying member, of a catch releasing member, a yoke connected to said catch releasing member through which the guard carrying member passes, said guard carrying member being arranged to act upon the catch releasing member at the limit of its movement into protective position, and means carried by the guard carrying member and arranged to enter said yoke and act reversely upon said catch releasing member at the beginning of movement of said guard member out of protective position.

In testimony whereof, I hereunto affix my signature in the presence of two witnesses.

EMIL ROTH.

Witnesses:
W. E. SHEPPARD,
L. S. CHADWICK.